United States Patent Office 3,276,982
Patented Oct. 4, 1966

3,276,982
METHOD OF GENERATING FREE ACYL RADICALS BY IRRADIATION OF ACYL DERIVATIVES OF DITHIOCARBOXYLIC ACIDS
Derek Harold Richard Barton, London, England, assignor to Research Institute for Medicine and Chemistry, Inc., Cambridge, Mass., a body corporate of Massachusetts
No Drawing. Filed Mar. 26, 1963, Ser. No. 267,951
Claims priority, application Great Britain, Apr. 3, 1962, 12,789/62
20 Claims. (Cl. 204—158)

This invention concerns a novel photolytic process of use in chemical synthesis.

As is well-known, chemical reactions, particularly in organic chemistry, may involve a mechanism in which a free radical is first formed which may then react with other substances present. In some cases the presence of free radicals may serve to initiate reaction, well-known examples of such reactions being free radical initiated polymerisation. A reliable method of generating free radicals of a given kind can therefore be of considerable value in chemical synthesis.

It is a principal object of the present invention to provide a reliable method of generating free acyl radicals.

It has been found that when acyl derivatives of dithiocarboxylic acids are irradiated with radiation in the range 300–500 mμ, that is the principal absorption band of the dithiocarboxyl group, free acyl radicals are formed together with free radicals derived from the remainder of the molecule. The liberated acyl radicals then react in various ways, which are principally determined by the reaction conditions and the nature of the substance irradiated and the substances present, to form further compounds such as $\alpha,\alpha$-diketones and dithiocarboxylates which are of particular interest in chemical synthesis.

According to the present invention I provide a method of generating free acyl radicals in which an acyl derivative of a dithiocarboxylic acid, the acyl group of which is attached to a sulphur atom of the dithiocarboxyl group, is irradiated with radiation in the wave-length range 300–500 mμ to liberate said free acyl radicals.

Thus, for example, the acyl derivative may be a compound of the general formula R—CO—S—CS—X, where R is a hydrocarbon group and X is an inert grouping as described below, and the photolytic dissociation may be represented as

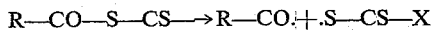

R may, for example, be an aliphatic or cycloaliphatic group, an araliphatic group or an aromatic group, e.g. an alkyl group which may be straight or branched chained e.g. having 1 to 20 carbon atoms, such as a methyl, ethyl, propyl group, an aralkyl group e.g. a benzyl, cinnamyl group etc. or an aryl group such as phenyl, tolyl, naphthyl group etc. The group R may thus, for example, be a steroid residue derived from an acid R.COOH, for example cholanic acid or a derivative thereof.

The group R may also carry substituents such as hydroxyl, acyl, acyloxy, oxo, primary, secondary or tertiary amino, acylamido, nitro, ether or thioether groups or may be the residue of a dicarboxylic acid in combination with two dithiocarboxylic acid molecules, as in glutaryl dixanthate etc.

The group X may, for example, be a substituted or unsubstituted amino group, e.g. a mono or di-alkyl or acyl-amino group or a group $OR^1$, as in the xanthates, or $R^1$ or $SR^1$, where $R^1$ is a hydrocarbon group such as an alkyl group, e.g. a lower alkyl group having 1–6 carbon atoms, for example a methyl, ethyl, propyl, butyl group etc., an aralkyl group such as a benzyl or cinnamyl group or an aryl group such as phenyl, tolyl, naphthyl group etc. The groups $R^1$ may also carry substituents as in the groups R above.

The subsequent behaviour of the free acyl radicals liberated by photolysis may follow a number of courses and these are set out below:

(1) The radicals may be stable under the reaction conditions but react with other substances present in the reaction system or with themselves. This occurs when the irradiation is effected at below the thermal decomposition temperature of the acyl radicals. Substances which may usefully react with the free acyl radicals include for example, olefins which add either one or two acyl groups at the double bond. The stable free radicals may also be used to initiate polymerisations of the kind which proceed by free-radical mechanisms, e.g. of mono or di-olefins etc. The acyl radicals may react with each other to form diketones.

This self condensation of the acyl radicals is of especial value since $\alpha,\alpha$-diketones are a useful type of intermediate in chemical syntheses. Thus, for example, if the acyl derivative is a bis-compound derived from glutaric acid e.g. the bis-xanthate, it is possible to produce cyclic diketones such as cyclopentan-1,2-dione. Such cyclisations are advantageously effected under conditions favouring intra-molecular reaction, e.g. at low concentrations and temperatures.

(2) The free acyl radicals may decompose to give a free hydrocarbon radical and carbon monoxide; this may be represented as R—CO.→R.+CO.

The conditions under which this decomposition takes place depend principally on the nature of the radical R. As a general principle, the decomposition is favoured by elevated temperature but the minimum temperature at which production of R. radicals predominates, i.e. the thermal decomposition temperature, depends mainly upon the degree of branching or substitution of the radicals. The order of stability of the radicals R—CO. may be generalised as primary alkyl>secondary alkyl>tertiary alkyl>aralkyl, the thermal decomposition temperatures being; approximately 100° C. (primary), 70° C. (secondary), 40° C. (tertiary), room temperature (benzyl).

To confirm the formation of R. radicals from R—CO. radicals as indicated above, 3α-acetoxy-11-ketobisnoralloocholanic acid chloride was converted to the O-ethylxanthate and photolysed in benzene to yield two O-ethyl-S-(3β-acetoxy-11-ketoallopregnan-20-yl)xanthates. These compounds must have been 20α- and 20β-isomers, because both gave 3β-acetoxyallopregnan-11-one on Raney nickel desulphurisation and the loss of stereo-chemistry at the 20-carbon atom indicates that the bond to that atom must have been broken by a free radical mechanism.

The R. radicals which result from decomposition may then for example recombine with the .S—CS—X radical to form compounds of the formula R—S—CS—X which are stable under the irradiation conditions but may be readily decomposed, e.g. by alkaline hydrolysis, to give thiols R—SH. The present process thus provides means whereby an acid R.COOH may be converted into the thio R—SH.

The R. radicals may also condense with other R. radicals to form dimers R—R. Thus, for example, acetyl-mandelyl O-ethyl xanthate on irradiation gives, as a major product, hydro-benzoin diacetate formed presumably by combination of two acetylbenzyl radicals. In the last-mentioned reaction, a reactive substance such as an aliphatic, araliphatic or aromatic thiol if included in the reaction mixture, reacts preferentially with the R. radicals. Benzyl thiol is especially effective. In the case of benzyl thiol, and other thiols, the resulting product is a thioether.

It is to be noted, however, that while a thiol present in the reaction mixture is able to capture R. radicals when the acyl radicals R—CO. are markedly unstable, stable acyl radicals are able to react directly with the thiol which may thus be incorporated into the reaction mixture to prevent either decomposition of the acyl radicals or reaction with the .S.CS—X radicals to re-form the dithiocarboxylic acid derivative initially irradiated. Thus, for example, irradiation of phenyl acetyl xanthate at room temperature in the presence of benzyl thiol gives a high proportion of benzyl thiophenyl acetate.

As an illustration of the dependence of the products of photolysis upon reaction conditions, the irradiation of both branched and unbranched alkyl derivatives is described below.

Irradiation of O-ethyl isobutyryl and O-ethyl trimethylacetylxanthates in benzene solution proceeded smoothly to give O-ethyl isopropyl- and tert.-butyl-xanthates respectively. These compounds were characterised by alkaline hydrolysis to the corresponding thiols. The results obtained were independent of the light source (tungsten or mercury arc lamps) used.

Somewhat different results were obtained in the photolysis of O-ethyl n-valerylxanthate. In benzene solution using a tungsten lamp the rate of photochemical decomposition was slow and after 24 hours, alkaline hydrolysis of the product gave 86% n-valeric acid and only 8% of n-butyl mercaptan. Using refluxing toluene as solvent and irradiation for 48 hours, 43% of n-butyl mercaptan were obtained after alkaline hydrolysis of the product. Irradiation for 36 hours in benzene using a mercury arc lamp also gave a reasonable yield of O-ethyl S-n-butylxanthate as judged by hydrolysis to n-butyl mercaptan (68%). Primary mercaptans can, therefore, be prepared from primary aliphatic acids by this method, but the process is slower than with the branched analogues.

In all photochemical reactions described in the present specification the appropriate blank thermal experiment was carried out to ensure that a true photochemical reaction was under investigation. In addition, the pyrolysis of a typical acylxanthate was studied. Heating O-ethyl S-phenylacetylxanthate at 200° for one and a half hours (complete decomposition) gave ethyl phenylacetate and carbon disulphide as main products. The absence of any detectable amount of carbonyl sulphide in the pyrolysate suggests that the acylxanthate does not rearrange to a dithiocarbonate before decomposition. The thermal decomposition of aroylxanthates appears to be a much more complex process. It is clear, however, that the pyrolytic and photolytic reactions of acylxanthates lead to quite different products.

It will be appreciated from the foregoing that the course of the photolytic and associated chemical reactions depend largely upon the reaction conditions and in particular upon the temperature and the presence or absence of reactive substances.

The photolysis is normally effected in an inert solvent medium and since it is convenient to effect the reaction under reflux to maintain constant temperature, the choice of solvent is determined largely by the desired reaction temperature. Solvents having convenient boiling points include, for example cyclic or acylic ethers such as diethyl ether, tetrahydrofuran, dioxan etc, aromatic hydrocarbons such as benzene, toluene etc., chlorinated hydrocarbons such as carbon tetrachloride etc. A study of the irradiation of O-ethyl-S-phenylacetyl xanthate in various solvents under reflux demonstrated that the reaction was faster in higher boiling solvents. The results are shown in Table I below. Thus, in refluxing toluene (110°) only two hours were required, whereas in ether (36°) seven hours were needed to complete the reaction. All the experiments recorded in the table refer to irradiation with mercury arc lamp under standard conditions (a tungsten lamp gave reaction rates about six times slower).

Yields were conveniently determined by alkaline hydrolysis. The percentage of benzyl thiol indicates the success of the desired reaction whilst the percentage of phenylacetic acid shows either that the reaction was not complete or else that thermal acylxanthate decomposition occurred in the sense discussed above.

TABLE I

Irradiation of O-ethyl S-phenylacetylxanthate in various solvents

| Solvent | Approx. reflux temp. | Reaction time (hr.) | Products (after alkaline hydrolysis) | |
|---|---|---|---|---|
| | | | $PhCH_2$—SH | $PhCH_2$—$CO_2H$ |
| $Et_2O$ | 36 | 7 | 97 | trace |
| $C_4H_2O$ | 65 | 5 | 96 | trace |
| $CCl_4$ | 77 | 6 | 75 | 11 |
| EtOH | 79 | 1 | 33 | 55 |
| $C_6H_6$ | 80 | 4 | 82 | 4 |
| Dioxan | 102 | 3 | 96 | trace |
| Toluene | 110 | 2 | 91 | trace |

The irradiation is advantageously carried out using a mercury vapour lamp; a tungsten lamp also gives radiation of the required wave length but produces a much slower photolytic reaction. The irradiation is preferably principally within the range 300–500 m$\mu$, preferably about 400 m$\mu$. It is to be noted that the photolysis here concerned gives an especially high quantum yield and is thus particularly readily effected.

The acyl derivatives of dithiocarboxylic acids used as starting materials may be prepared from the appropriate acid halides, e.g. the acid chlorides, by reaction with the alkali metal, e.g. sodium, salts of the acids. Thus, for example, acyl xanthates may be prepared by reaction of the corresponding acyl halide with a sodium xanthate, e.g. sodium O-ethyl xanthate. I have found, however, that at temperatures above about 0° C., the principal reaction product is the thioanhydride and temperatures below about 10° C. e.g. about —35° C. are the most suitable. Acetone is an especially suitable solvent for the reaction. The acylxanthates are slightly unstable but may be distilled in small batches for purification.

In order that the invention may be well understood, the following examples are given by way of illustration only.

M.p.s. were taken on the Kofler block. Ultraviolet absorption spectra were determined in ethanol solution using the Unicam S.P. 700 Spectrophotometer. Infrared spectra were taken on the Infracord Spectrometer (Model 137) and refer to liquid films unless specified to the contrary. [$\alpha$]$_D$ were taken in $CHCl_3$ solution. Unless specified to the contrary, "AnalaR" grade acetone dried over $K_2CO_3O$, methylene dichloride dried over $CaCl_2$ and benzene and toluene dried by distillation over sodium, were used. Irradiation experiments were carried out in Pyrex flasks using a 150 w. tungsten lamp or a 125 w. mercury lamp, in every case under dry oxygen-free nitrogen. Iodometric analysis of mercaptans was carried out as described by Kolthoff and Belcher.

EXAMPLE 1

*O-ethyl S-palmitoylxanthate.*—Sodium O-ethyl xanthate (320 mg.) was added in small portions to palmitoyl chloride (610 mg.) in methylene dichloride (10 ml.) and acetone (10 ml.) at —30° with good stirring, which was continued for 30 mins. more before allowing the solution to warm to room temperature. After washing with aqueous sodium hydrogen carbonate, with water and then drying ($Na_2SO_4$) the solvent was removed in vacuo at room temperature (736 mg.). Crystallization from methanol at 0–20° gave O-ethyl S-palmitoylxanthate as pale yellow needles, M.P. 28–30°, $\lambda_{max}$. 203, 227, 275 and 392 m$\mu$ ($\epsilon$=8,200, 8,500, 10,400 and 52 respectively), infrared band at 1727 (c.=0) cm.$^{-1}$. (Found: S, 17.9. $C_{19}H_{36}O_2S_2$ requires S, 17.5%.)

Repetition of the experiment at 0° instead of —30° gave, after chromatography over alumina (Grade 3) eluting with light petroleum (B.P. 40–60°) and crystallisation from the same solvent, palmitoyl thioanhydride (II; R=$C_{15}H_{31}$), M.P. 72–74°, $\lambda_{max.}$ 214 and 242 m$\mu$ ($\epsilon$=1,300 and 4,100 respectively), infrared bands (in $CCl_4$) at 1761 and 1706 (thioanhydride) cm.$^{-1}$. (Found: C, 75.15; H, 12.25; S, 6.6. $C_{32}H_{62}O_2S$ requires C, 75.25; H, 12.25; S, 6.3%.)

EXAMPLE 2

*O-ethyl S-phenylacetylxanthate.*—Sodium O-ethyl xanthate (10.8 g.) in acetone (175 ml.) was added to phenylacetyl chloride (11.6 g.) in acetone (200 ml.) at −35° over 30 mins. with good stirring. After keeping at the same temperature for one hour the reaction mixture was allowed to warm to room temperature. The solvent was removed in vacuo, water (50 ml.) added to the residue, and the product extracted into methylene dichloride. The extract was washed with aqueous sodium carbonate (1%), then with water, and dried ($Na_2SO_4$). Removal of the solvent in vacuo gave O-ethyl S-phenylacetylxanthate (17.8 g.) as an orange-yellow liquid. Rapid distillation gave the pure xanthate (97%), B.P. 100–105°/6.5×$10^{-2}$ mm., $n_D^{25°}$ 1.5971, $\lambda_{max.}$ 207, 226, 278, 300 and 396 m$\mu$ ($\epsilon$=17,000, 9,500, 8,600, 6,800 and 54 respectively), infrared band at 1725 (c.=0) cm.$^{-1}$. (Found: C, 55.2; H, 5.25; S, 26.75. $C_{11}H_{12}O_2S_2$ requires C, 55.0; H, 5.05; S, 26.7%.) Rapid distillation in small batches is essential in the purification of this, and other, acylxanthates. When distilled at a higher pressure (B.P. 125–135°/0.5 mm.) the yield was reduced (86%) and from the residue, after treatment with activated charcoal and crystallisation from light petroleum (B.P. 60–80°) there was isolated phenylacetic acid thioanhydride, M.P. 70.5–71.5°, $\lambda_{max}$ 208, 244 and 402 ($\epsilon$=21,200, 5,600 and 26 respectively), infrared bands at 1750 and 1700 (—CO—S—CO) cm.$^{-1}$. (Found: C, 70.9; H, 5.45; S, 11.7. $C_{16}H_{14}O_2S$ requires C, 71.1; H, 5.2; S, 11.85%.)

EXAMPLE 3

*Irradiation of O-ethyl S-phenylacetylxanthate.*—(a) In benzene using a tungsten lamp. The xanthate (2.403 g.) in benzene (250 ml.) was irradiated under reflux for 24 hours (fading of yellow colour). Removal of the solvent in vacuo gave O-ethyl S-benzylxanthate (1.85 g.), B.P. 95–97°/0.1 mm., $n_D^{25°}$ 1.6000, $\lambda_{max.}$ 207, 226, 279 and 353 m$\mu$ ($\epsilon$=16,500, 10,500, 10,900 and 63 respectively). (Found: C, 56.3; H, 6.15; S, 30.3. Calcd. for $C_{10}H_{12}OS_2$: C, 56.55; H, 5.7; S, 30.2%.) The compound was identified by these constants, by infrared comparison with an authentic specimen and by alkaline hydrolysis as follows. The irradiation porduct (2.11 g.) in 1 N sodium hydroxide in aqueous ethanol (90%; 50 ml.) was heated under reflux under nitrogen for one hour. Removal of the solvent in vacuo, addition of water (25 ml.), cautious acidifaction (2 N sulphuric acid) and extraction into $CH_2Cl_2$ (100 ml.) gave a product containing traces of phenyl-acetic acid (7%; extracted with aqueous sodium hydrogen carbonate). Removal of the solvent in vacuo gave benzyl mercaptan (1.00 g.), identified by iodometry, by infrared spectrum, by gas chromatography and by conversion to the 3,5-dinitrobenzoyl derivative (M.P. and mixed M.P.).

Irradiation exactly as above for 5 hours gave, after alkaline hydrolysis, benzyl mercaptan (22%) and phenylacetic acid (66%). After 12 hours the results were benzyl mercaptan (31%) and phenylacetic acid (45%).

In a blank experiment the acylxanthate (1.20 g.) in benzene (125 ml.) was refluxed under nitrogen for 24 hours in the dark. Removal of the solvent in vacuo gave unchanged starting material (1.11 g.), identified by infrared spectrum and by alkaline hydrolysis to phenylacetic acid (99%).

(b) In various solvents under reflux using a mercury arc lamp. These experiments were carried out on the same scale and under the same conditions as detailed above. The results have been given in Table I above. In each case the course of the reaction was followed by the change is U.V. spectrum.

(c) In benzene in the presence of benzyl mercaptan. The irradiation was carried out as above using a mercury arc lamp for 5 hours (U.V. control) with addition of benzyl mercaptan (2.48 g.). The benzene solution was washed with aqueous sodium hydroxide (4 N) (to remove unchanged benzyl mercaptan), with water and dried ($Na_2SO_4$). Removal of the solvent and hydrolysis as under (a) above gave phenylacetic acid (74%).

EXAMPLE 4

*Thermal decomposition of O-ethyl S-phenylacetylxanthate.*—The acylxanthate (2.40 g.) was heated at 200° for one and one half hours (no more carbon disulphide evolved) in a stream of nitrogen, the gases being passed into ethanolic potassium hydroxide (10%; 20 ml.). The xanthate content of this solution was determined (63%) by the method of Matuszak (Ind. Eng. Chem., Anal. Ed. 1932, 4, 98). The residue (1.59 g.), which showed strong infrared absorption at 1725 (c.=0) cm.$^{-1}$, was hydrolysed as above to give phenylacetic acid (86%). The residue contained (before and after hydrolysis) traces only of mercaptan.

In a second experiment the gases evolved in the nitrogen stream were passed into ether (85 ml.) containing piperidine (2.13 g.). The precipitated N-pentamethylenedithiocarbamate (78%) was identified by M.P., mixed M.P. and infrared spectrum. The residue (1.72 g.) from this pyrolysis was distilled to give ethyl phenylacetate (68%), B.P. 46°/0.5 mm., identified by infrared comparison.

EXAMPLE 5

*Irradiation of O-ethyl S-benzylxanthate.*—The xanthate (1.06 g.) in benzene (125 ml.) was irradiated with a mercury arc lamp for 8 hours under reflux. Removal of the solvent in vacuo gave unchanged starting material (1.04 g.), identified by infrared comparison.

EXAMPLE 6

*Preparation and irradiation of O-ethyl S-isobutyrylxanthate.*—Sodium ethylxanthate (7.21 g.) in acetone (100 ml.) was added slowly (30 mins.) with good stirring to isobutyryl chloride (5.33 g.) in acetone (150 ml.) at −35° and kept at this temperature for one hour before being allowed to warm up to room temperature. Removal of the solvent in vacuo and working up as described above for the phenylacetyl analogue gave the yellow O-ethyl S-isobutyrylxanthate (8.41 g.). This had (distilled in 1.0 g. portions), B.P. 60–63° 0.1 mm., $n_D^{25°}$ 1.5335, $\lambda_{max.}$ 207, 229, 275 and 397 m$\mu$ ($\epsilon$=5,200, 6,200, 6,250, 8,550 and 47 respectively), infrared band at 1730 (c.=0) cm.$^{-1}$. (Found: C, 43.9; H, 6.0; S, 32.85. $C_7H_{12}O_2S_2$ requires C, 43.7; H, 6.3; S, 33.35%.) The following irradiation conditions were applied to this compound.

(a) In benzene using a tungsten lamp. The acylxanthate (4.27 g.) in benzene (375 ml.) was irradiated under reflux using a tungsten lamp for 24 hours (fading of yellow colour). Removal of the solvent in vacuo gave essentially pure O-ethyl S-isopropylxanthate (3.99 g.). This was hydrolysed with aqueous ethanolic sodium hydroxide as in the examples above to give isopropyl mercaptan (99%), identified by titration and by conversion to 2,4-dinitrophenyl-isobutyric acid.

In a blank run in the dark the product gave isobutyric acid (87%) on hydrolysis.

(b) In benzene using a mercury arc lamp. The acylxanthate (2.89 g.) in benzene (250 ml.) was irradiated under reflux with a mercury arc lamp for two hours (fading of yellow colour). The product gave isopropyl mercaptan (99%) and no isobutyric acid on hydrolysis.

EXAMPLE 7

*Preparation and irradiation of O-ethyl S-trimethylacetyl-xanthate.*—Sodium ethyl xanthate (7.21 g.) in acetone (100 ml.) was added slowly (30 minutes) with good stirring to pivaloyl chloride (6.03 g.) in acetone (150 ml.) at —35° and kept at this temperature for one hour before being allowed to warm to room temperature. Working up as in the examples above gave the golden-yellow O-ethyl S-trimethylacetylxanthate (10.3 g.). This had (distilled in 1.0 g. portions) B.P. 75°/0.1 mm., $n_D^{25°}$ 1.5250, $\lambda_{max}$ 207, 232, 275 and 398 m$\mu$ ($\epsilon$=4,900, 6,200, 8,000 and 49 respectively), infrared band at 1720 (c.=0) cm.$^{-1}$. (Found: C, 47.15; H, 6.95; S, 31.25. $C_8H_{14}O_2S_2$ requires C, 46.6; H, 6.85; S, 31.1%.) The following irradiation conditions were applied to this compound.

(a) In benzene using a tungsten lamp. The acylxanthate (2.06 g.) in benzene (250 ml.) was irradiated under reflux using a tungsten lamp for 14 hours (ultraviolet control). Removal of the solvent in vacuo afforded somewhat impure O-ethyl S-tert.-butylxanthate (1.62 g.). This had (1.445 g.; 81%) B.P. 68–70°/1.75 mm., $n_D$ 1.5248, $\lambda_{max}$ 208, 219, 285 and 360 m$\mu$ ($\epsilon$=7,600, 7,200, 11,800 and 70 respectively). (Found: C, 47.4; H, 7.5; S, 36.1. $C_7H_{14}OS_2$ requires: C, 47.15; H, 7.9; S, 35.95%.)

In a second experiment the acylxanthate (3.1 g.) in benzene (350 ml.) was irradiated as above for 24 hours (ultraviolet control). Removal of the solvent in vacuo and hydrolysis of the product (2.27 g.) with aqueous ethanolic sodium hydroxide (1 N; 90%; 25 ml.) gave tert.-butyl mercaptan (79%), characterised as its 2,4-dinitrophenyl derivative (M.P., mixed M.P. and infrared comparison).

In a blank experiment the acylxanthate (2.06 g.) in benzene (16 ml.) was refluxed for 24 hours in the dark. Removal of the solvent in vacuo gave unchanged starting material (infrared spectrum). Alkaline hydrolysis as above gave pivalic acid (88%) and only traces of tert.-butyl mercaptan (odour).

(b) In benzene using a mercury arc lamp. The acylxanthate (2.06 g.) in benzene (250 ml.) was irradiated under reflux using a mercury arc lamp for 4 hours (ultraviolet control). Removal of the solvent gave O-ethyl S-tert.-butylxanthate (1.46 g.), B.P. 62–64°/1.5 mm. (1.24 g.). This was identical (infrared comparision) with the compound obtained in experiment (a) immediately above.

EXAMPLE 8

*Preparation and irradiation of O-ethyl S-n-valerylxanthate.*—Sodium ethyl xanthate (10.1 g.) in acetone (100 ml.) was reacted with n-valeryl chloride (8.44 g.) in acetone (150 ml.) as in the analogous examples cited above to give O-ethyl S-n-valeryl-xanthate as an orange yellow liquid (99%), B.P. 92–94°/1 mm. (93%), $n_D^{25°}$ 1.5158, $\lambda_{max}$ 208, 228, 276 and 394 m$\mu$ ($\epsilon$=6,000, 6,300, 8,700 and 50 respectively), infrared band at 1730 (c.=0) cm.$^{-1}$. Satisfactory analytical data were not secured for this compound. The following irradiation conditions were applied to this compound.

(a) In benzene using a tungsten lamp. The acylxanthate (3.1 g.) in benzene (250 ml.) was irradiated under reflux with a tungsten lamp for 24 hours. Alkaline hydrolysis as in examples detailed above afforded n-valeric acid (86%) and n-butyl mercaptan (8%; determined iodometrically). In a second run, when the irradiation was continued for 48 hours, alkaline hydrolysis gave n-valeric acid (83%) and n-butyl mercaptan (14%).

(b) In benzene using a mercury arc lamp. The acylxanthate (2.06 g.) in benzene (250 ml.) was irradiated under reflux using a mercury arc lamp for 36 hours. Alkaline hydrolysis gave n-valeric acid (30%) and n-butyl mercaptan (68%).

(c) In toluene using a tungsten lamp. The acylxanthate (3.1 g.) in toluene (250 ml.) was irradiated under reflux with a tungsten lamp for 48 hours (fading of the yellow colour). The product (2.34 g.) was hydrolysed as in the examples above to give n-valeric acid (22%; infrared comparison) and n-butyl mercaptan (43%). The latter was characterised as its 2,4-dinitrophenyl derivative (M.P., mixed M.P. and infrared comparison). In a second run irradiation for 24 hours furnished n-valeric acid (30%) and n-butyl mercaptan (40%).

In a blank experiment the acylxanthate (3.1 g.) in toluene (250 ml.) was refluxed in the dark for 24 hours. Hydrolysis of the product gave n-valeric acid (73%; infrared comparison) and n-butyl mercaptan (2%; iodometric determination).

EXAMPLE 9

*Preparation and irradiation of O-ethyl S-acetylmandelylxanthate.*—Sodium O-ethylxanthate (10.63 g.) in acetone (125 ml.) was added to acetylmandelyl chloride (10.63 g.) in acetone (125 ml.) at —35° as in examples above. Removal of the solvent gave O-ethyl S-acetylmandelylxanthate (14.45 g.). Crystallised from light petroleum (B.P. 40–60°) this formed golden yellow prisms (83%). M.P. 40–41°, $\lambda_{max}$ 205, 222, 272 and 383 m$\mu$ ($\epsilon$=18,400, 9,500, 6,900 and 46 respectively). (Found: C, 52.5; H, 4.8; S, 20.8. $C_{13}H_{14}O_4S_2$ requires C, 52.3; H, 4.75; S, 21.5%.) The following irradiation conditions were applied to this compound.

(a) In benzene using a mercury arc lamp. The acylxanthate (2.98 g.) in benzene (250 ml.) was irradiated under reflux for 6 hours (ultraviolet control). Removal of the solvent in vacuo gave a viscous liquid (2.67 g.) which, on crystallisation from light petroleum (B.P. 40–60°), gave hydrobenzoin diacetate (21%), identified by M.P., mixed M.P. and infrared comparison. (Found: C, 72.5; H, 6.0. Calc. for $C_{18}H_{18}O_4$: C, 72.45; H, 6.1%.)

In a second run the acylxanthate (2.98 g.) in benzene (250 ml.) was irradiated for 18 hours. The product was taken up in ethanol (10 ml.), water (5 ml.) and conc. sulphuric acid (1.0 ml.), refluxed for 30 mins. and then treated with 2,4-dinitrophenylhydrazine (2.97 g.) in ethanol (30 ml.) and conc. sulphuric acid (5 ml.). This procedure furnished benzaldehyde 2,4-dinitrophenylhydrazone (26%, identified by M.P., mixed M.P. and infrared comparison).

(b) In benzene with addition of benzyl mercaptan. The acylxanthate (2.98 g.) and benzyl mercaptan (3.73 g.) in benzene (250 ml.) were irradiated under reflux using a mercury arc lamp for 6 hours. Treatment with 2,4-dinitrophenylhydrazine reagent as above gave benzaldehyde 2,4-dinitrophenylhydrazone (39%), identified as above.

EXAMPLE 10

*Preparation and irradiation of O-ethyl S-glutarylxanthate.*—Sodium O-ethylxanthate (7.21 g.) in acetone (75 ml.) was added to glutaryl chloride (4.23 g.) in acetone (75 ml.) at —35° as in the examples above. Crystallisation of the product from light petroleum (B.P. 40–60° C.) gave O-ethyl S-glutarylxanthate (84%), M.P. 59–60°, $\lambda_{max}$ 204, 225, 272 and 385 m$\mu$ ($\epsilon$=16,400, 13,600, 17,700 and 99 respectively). (Found: C, 38.95; H, 4.75; S, 38.25. $C_{11}H_{16}O_4S_4$ requires C, 38.8; H, 4.75; S, 37.65%.) The following irradiation conditions were applied to this compound.

The acylxanthate (1.70 g.) in benzene (250 ml.) was irradiated under reflux using a mercury arc lamp for 26 hours (fading of the yellow colour). Treatment of the product in ethanol with 2,4-dinitrophenylhydrazine reagent gave cyclopentane-1,2-dione 2,4-dinitrophenyl-osazone (31%), identified by M.P., mixed M.P., and infrared comparison.

In a second run the acylxanthate (1.70 g.) in benzene (750 ml.) was irradiated at 40° (fan) for 24 hours. Treatment of the product with 2,4-dinitrophenylhydrazine reagent gave cyclopentane-1,2-dione 2,4-dinitrophenyl-osazone (55%).

EXAMPLE 11

*Preparation and Irradiation of O-ethyl S-benzoylxanthate.*—Sodium O-ethylxanthate (10.8 g.) in acetone (125 ml.) was reacted with benzoyl chloride (10.55 g.) in acetone (250 ml.) at −35° in the usual manner. The orange yellow O-ethyl S-benzoylxanthate (16.9 g.) had $\lambda_{max.}$ 206, 250, 283 and 402 m$\mu$ ($\epsilon$=17,500, 14,300, 12,900 and 120 respectively), infrared band at 1680 (c.=0) cm.$^{-1}$. The following irradiation conditions were applied to this compound.

(a) In benzene using a tungsten lamp. The acylxanthate (3.39 g.) in benzene (250 ml.) was irradiated under reflux for 24 hours using a tungsten lamp. Removal of the solvent gave a viscous liquid (3.26 g.) showing a strong band in the infared at 1685 (c.=0) cm.$^{-1}$. Alkaline hydrolysis as in the examples above gave benzoic acid (90%), identified by M.P., mixed M.P. and infrared comparison.

(b) In toluene using a tungsten lamp. The acylxanthate (3.39 g.) in toluene (250 ml.) was irradiated under reflux using a tungsten lamp for 24 hours. The product (3.27 g.) showed a strong band in the infrared at 1695 (c.=0) cm.$^{-1}$ and gave benzoic acid (88%) on alkaline hydrolysis.

EXAMPLE 12

*Preparation and irradiation of O-ethyl-S-p-chlorobenzoylxanthate.*—Sodium O-ethylxanthate (2.88 g.) in acetone (50 ml.) was added to p-chlorobenzoyl chloride (3.4 g.) in acetone (50 ml.) at −35° as in the examples above. Crystallisation of the product (6.03 g.) from light petroleum (B.P. 40–60°) gave O-ethyl S-p-chlorobenzoylxanthate (85%), M.P. 65.5–66.5°, $\lambda_{max.}$ 204, 217, 262, 278 and 385 m$\mu$ ($\epsilon$=21,000, 13,500, 16,200, 14,700 and 133 respectively).

This acylxanthate (1.3 g.) in benzene (125 ml.) was irradiated under reflux for 20 hours using a mercury arc lamp. Alkaline hydrolysis of the product gave p-chlorobenzoic acid (68%), identified by M.P., mixed M.P. and infrared comparison.

EXAMPLE 13

*Preparation and irradiation of O-ethyl 3β-acetoxy-11-ketobisnorallocholanoylxanthate*

Sodium O-ethyl xanthate (740 mg.) was added in small portions to 3β-acetoxy-11-ketobisnorallocholanoyl chloride (2.0 g.) (prepared by interaction of acetoxy-11-ketobisnorallocholanic acid with oxalyl chloride in the usual way) in acetone (100 ml.) in the usual way (see above). Crystallisation of the product from ether light petroleum gave O-ethyl 3β-acetoxy-11-ketobisnorallocholanoylxanthate (180 g.) as yellow prisms, M.P. 123–125°, $[\alpha]_D+56°$ (c. 1.55), $\lambda_{max.}$ 204, 231, 277 and 398 m$\mu$ ($\epsilon$=8,300, 7,600, 10,800 and 94 respectively). (Found: C, 63.5; H 7.9; S 12.75. $C_{27}H_{40}O_5S_2$ requires C 63.75; H, 8.0; S, 12.6%.)

The acylxanthate (600 mg.) in benzene (36 ml.) was irradiated with a tungsten lamp at 40° (fan) for 30 mins. (disappearance of the yellow colour). The process was repeated four times. The combined product (2.89 g.) was chromatographed over alumina (Grade III, 145 g.). Careful fractionation with light petroleum (B.P. 40–60°)-benzene mixtures gave two isomeric xanthates. The more easily eluted isomer-I formed long needles M.P. 193–195°, $[\alpha]_D+54°$ (c. 0.50), $\lambda_{max.}$ 203, 224 and 281 m$\mu$ ($\epsilon$=7,500, 7,900 and 14,000 respectively), infrared bands (11-ketone) cm.$^{-1}$. (Found: C, 65.0; H, 8.3; S, 13.45. $C_{26}H_{40}O_4S_2$ requires C, 65.0; H, 8.4; S, 13.3%. The less easily isolated isomer-II formed prisms or plates, M.P. 138–140°, $[\alpha]_D+69°$ (c. 0.73), $\lambda_{max.}$ 205, 223 and 281 m$\mu$ ($\epsilon$=7,400, 8,100 and 13,500 respectively), infrared bands (in Nujol) at 1732 (acetate) and 1705 (11-ketone) cm.$^{-1}$. (Found: C, 65.3; H, 8.6; S, 12.65. $C_{26}H_{40}O_4S_2$ requires C, 65.0; H, 8.4; S, 13.3%.) The two isomers gave a M.P. depression on admixture.

Isomer-I (150 mg.) and Raney nickel (1.5 g.) in methanol (50 ml.) were refluxed for 4 hours. Crystallisation of the product from aqueous methanol gave 3β-acetoxyallopregnan-11-one (see below) (94 mg.), identified by M.P., mixed M.P., $[\alpha]_D$ and infrared comparison.

Isomer-II (50 mg.) and Raney nickel (1 g.) in methanol (30 ml.) similarly afforded 3β-acetoxyallopregnan-11-one (see below), identified by M.P., mixed M.P., $[\alpha]_D$ and infrared comparison.

*Preparation of 3β-acetoxyallopregnan-11-one*

3β - acetoxyallopregnan-11,20-dione (465 mg.) was treated with ethylene-1,2-dithiol (10 drops) and boron trifluoride (45% in ether; 15 drops) at room temperature for five minutes (set solid after one minute) and poured into methanol (excess). Crystallisation of the product from methylene dichloride-ethanol gave 3β-acetoxyallopregnan-11,20-dione 20-ethylendithioketal (300 mg.), M.P. 234–237°, $[\alpha]_D+22°$ (c. 1.50), infrared bands (Nujol) at 1725 (acetate) and 1695 (11-ketone). (Found: C, 66.05; H, 8.5; S, 14.1. $C_{25}H_{32}O_3S_2$ requires C, 66.65; H, 8.5; S, 14.2%.)

This dithioketal (237 mg.) in ethanol (50 ml.) was refluxed with Raney nickel (activity W 1; 2 g.) for 16 hours. Crystallisation of the product from aqueous methanol gave 3β-acetoxyallopregnan-11-one (XI; X=H), M.P. 160–163°, $[\alpha]_D+40°$ (c. 1.90), infrared bands (Nujol at 1731 (acetate) and 1705 (11-ketone) cm.$^{-1}$. Found: C, 76.6; H, 10.3; Ac, 11.85. $C_{23}H_{36}O_3$ requires C, 76.6; H, 10.05; Ac, 11.95%.)

EXAMPLE 14

*Preparation and irradiation of n-butyl thioisobutyrate.*—n-Butyl mercaptan (4.51 g.) and isobutyryl chloride (5.33 g.) in pyridine (8 g.) were heated on the steam bath for two hours. Working up in the usual way gave n-butyl thioisobutyrate (VI) (83%), B.P. 58–59°/3.3 mm., $\lambda_{max.}$ 233 and 276 m$\mu$ ($\epsilon$=4,100 and 688 respectively), infrared band at 1680 (c.=0) cm.$^{-1}$. (Found: C, 60.2; H, 10.15; S, 19.75. $C_8H_{16}OS$ requires C, 60.0; H, 10.05; S, 20.0%.)

This thioester (1.60 g.) in diethyl ether (100 ml.) was irradiated under reflux using a mercury arc lamp for 6 hours. Removal of the solvent gave unchanged starting material (97%), identified by infrared comparison. Essentially the same result was observed after irradiation in ethanol for 7 hours.

I claim:

1. A method of generating free acyl radicals in which an acyl derivative of a dithiocarboxylic acid, the acyl group of which is attached to a sulphur atom of the dithiocarboxyl group, is irradiated with radiation in the wave-length range 300–500 m$\mu$ to liberate said free acyl radicals.

2. A method as claimed in claim 1 in which the acyl derivative has the general formula

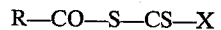

R—CO—S—CS—X where R is a member selected from the group consisting of a hydrocarbon radical and a hydrocarbon radical substituted with at least one member selected from the group consisting of a halogen atom and hydroxyl, oxo, acyl, acyloxy, acylamido, nitro, ether, thioether, primary amino, secondary amino, tertiary amino and

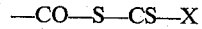

—CO—S—CS—X groups and X is a member selected from the group consisting of R, —OR, —SR and primary amino, secondary amino, tertiary amino and acylamido groups.

3. A method as claimed in claim 2 in which R is an alkyl or cycloalkyl group having 1–20 carbon atoms.

4. A method as claimed in claim 3 in which R is a methyl, ethyl, propyl, n-butyl, t-butyl, palmityl, benzyl, cinnamyl, phenyl, tolyl or naphthyl group.

5. A method as claimed in claim 2 in which X is an alkoxy group having 1–6 carbon atoms.

6. A method as claimed in claim 2 in which X is a methoxy, ethoxy, propoxy, or butoxy group.

7. A method as claimed in claim 1 in which irradiation is effected at below the thermal decomposition temperature of the liberated acyl radicals.

8. A method as claimed in claim 7 in which irradiation is effected in the absence of further reactive substances to yield an $\alpha,\alpha$-diketone by self-condensation of the acyl radicals.

9. A method as claimed in claim 8 in which the irradiation of the acyl derivative is effected in dilute solution and at no greater than ambient temperature.

10. A method as claimed in claim 7 in which irradiation is effected in the presence of a thiol to cause combination of the acyl radicals therewith to form a monothiocarboxylate.

11. A method as claimed in claim 2 in which irradiation is effected at above the thermal decomposition temperature of the liberated acyl radicals to generate radicals R. and carbon monoxide.

12. A method as claimed in claim 11 in which the irradiation is effected in the absence of further reactive substances to cause combination of the said radicals R. and the radicals .S—CS—X liberated during irradiation, to form dithiocarboxylates of the general formula

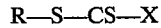

R—S—CS—X

13. A method as claimed in claim 12 in which said dithiocarboxylates are subsequently hydrolysed to form thiols of the general formula R—SH or salts thereof.

14. A method as claimed in claim 13 in which the hydrolysis is effected with aqueous alkali.

15. A method as claimed in claim 11 in which irradiation is effected in the presence of a thiol which combines with the radicals R. to form a thioether.

16. A method as claimed in claim 15 in which the thiol is an aliphatic, araliphatic or aryl thiol.

17. A method as claimed in claim 16 in which the thiol is benzyl thiol.

18. A method as claimed in claim 1 in which irradiation is effected in solution in a cyclic or acyclic ether solvent, an aromatic hydrocarbon solvent or a chlorinated hydrocarbon solvent.

19. A method as claimed in claim 18 in which the solvent is diethyl ether, tetrahydrofuran, dioxan, benzene, toluene or carbon tetrachloride.

20. A method as claimed in claim 1 in which the radiation is generated by a mercury vapour lamp.

References Cited by the Examiner
UNITED STATES PATENTS
2,904,561  9/1959  Dodson et al. _____ 204—158 X JOHN M. MACK, *Primary Examiner.*

H. S. WILLIAMS, *Assistant Examiner.*